UNITED STATES PATENT OFFICE.

MARTIN EKENBERG, OF LONDON, ENGLAND, ASSIGNOR TO TECHNO-CHEMICAL LABORATORIES LIMITED, OF LONDON, ENGLAND.

DESICCATING MILK.

999,972.   Specification of Letters Patent.   Patented Aug. 8, 1911.

Application filed August 14, 1909. Serial No. 512,841.

*To all whom it may concern:*

Be it known that I, MARTIN EKENBERG, M. A., Ph. D., a subject of the King of Sweden, and residing at Victoria Buildings, 37 Queen Victoria street, London, E. C., England, have invented certain new and useful Improvements in and Relating to the Desiccation of Milk and Milk Preparations, of which the following is a specification.

This invention relates to the desiccation of milk, cream and liquid preparations of which milk is a constituent.

It is known that milk can be desiccated in the form of a fine spray injected into a current of heated air. The product so obtained is, however, strongly oxidized and the operation is connected with certain difficulties of a technical nature as a result of the great volumes of air which have to be used for efficient drying. It is difficult to separate the dried products from the air, and the loss of heat is considerable. Attempts to replace air with nitrogen, hydrogen and certain other non-oxidizing gases have not given satisfactory results. The dry substance thus obtained though not oxidized becomes rancid after a short period, as in the case when air is used. I have discovered, however, that highly satisfactory results are obtained if the air be replaced by carbon dioxid or a mixture of carbon dioxid and water vapor.

This invention consists in the use of carbon dioxid with or without water vapor (in the case when the latter is used the proportion of carbon dioxid to the same preferably not exceeding 6 to 1 by volume for the desiccation of milk and milk preparations) as by spraying the liquid or passing it in a finely divided form by and or into a heated current of dry or moist carbon dioxid with or without added water vapor and then collecting the desiccated product.

The invention also consists in the process for the desiccation of substances such as those referred to above consisting in spraying the liquid into a heated circulating current of water vapor and carbon dioxid, separating the desiccated product from the gaseous mixture, cooling the gaseous mixture sufficiently to eliminate a quantity of water substantially corresponding to that taken up from the spray and again heating the gaseous mixture.

The invention also consists in the desiccated products obtained by the use of the processes referred to herein.

The invention further consists in the improvements in the process for the desiccation of milk and milk preparations referred to herein.

Figure 1:
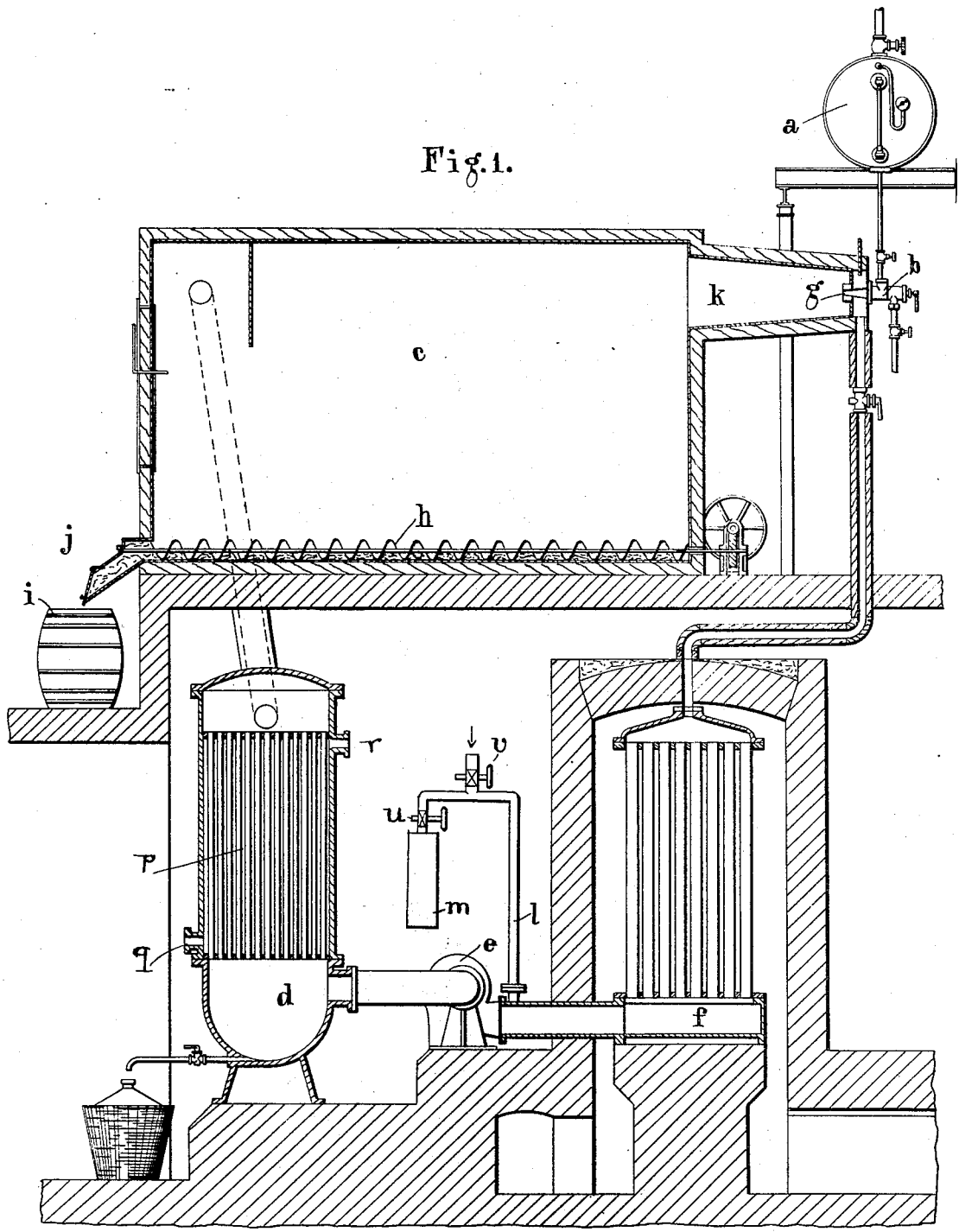
Figure 2:
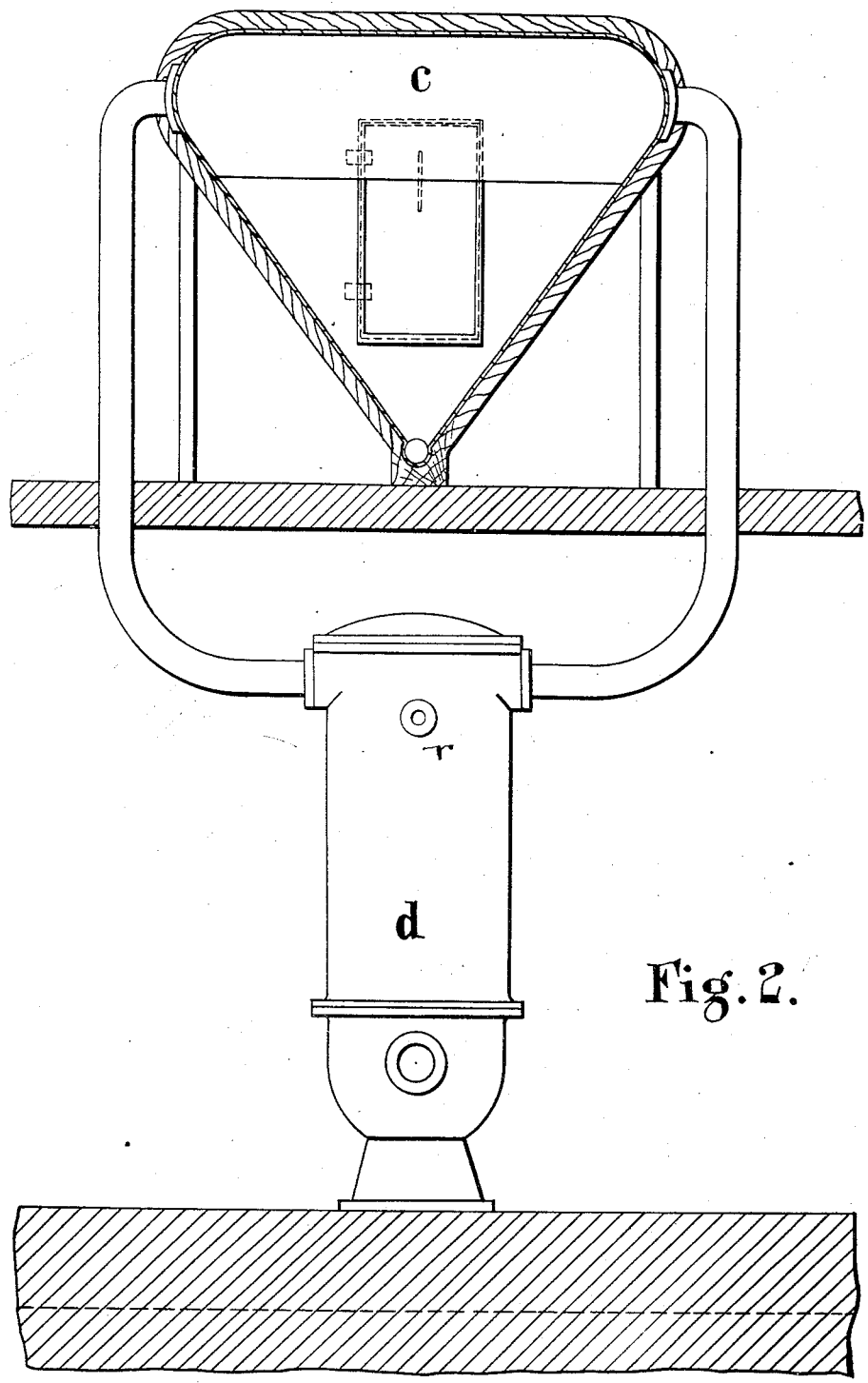
Figure 3:
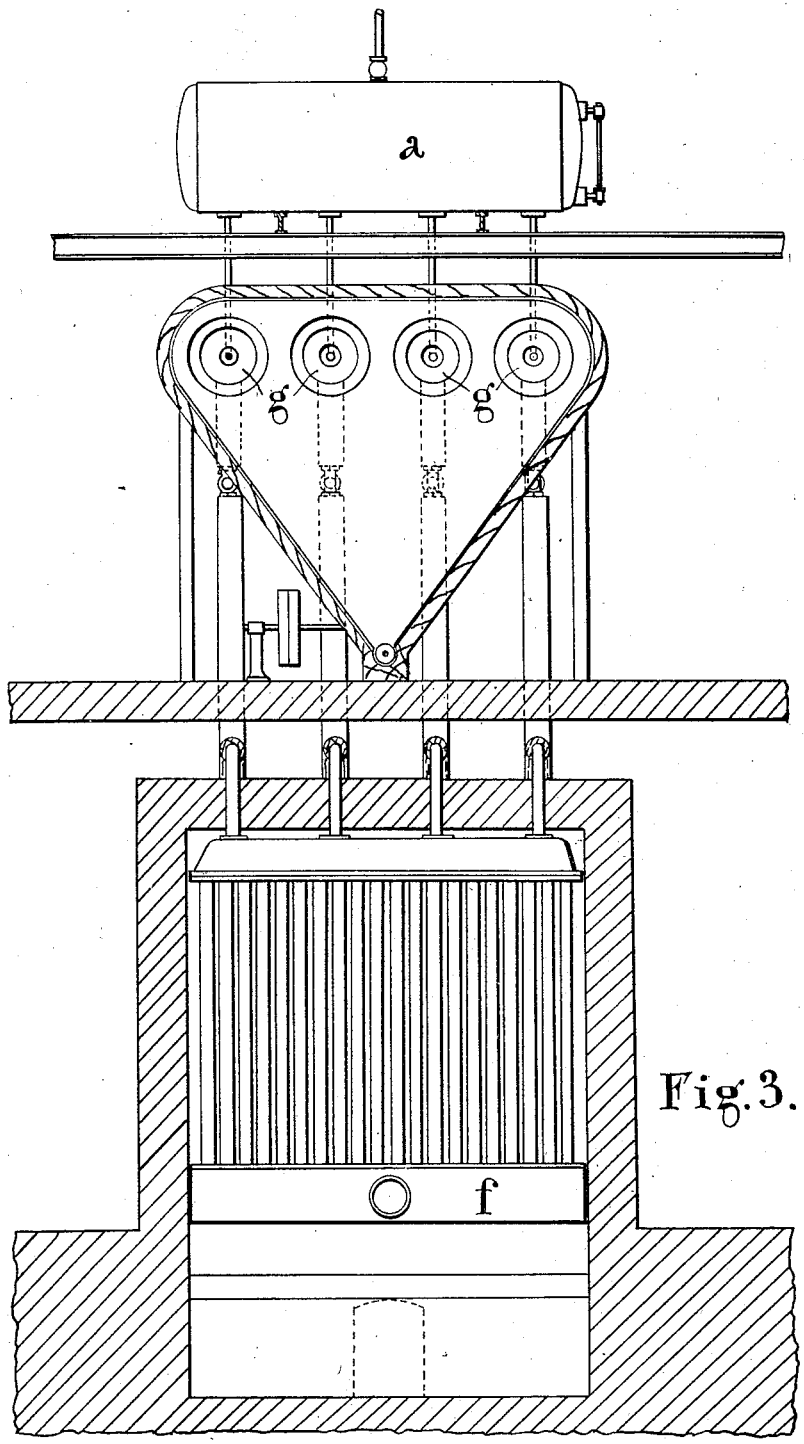

Referring to the accompanying diagrammatic drawings, Figure 1 shows in part sectional elevation an arrangement according to one form of this invention. Figs. 2 and 3 are views at right angles to Fig. 1 from the condenser and heater end respectively.

In carrying the invention into effect in the preferred form utilizing by way of example the apparatus illustrated, the milk, or other liquid to be treated, contained in a suitable reservoir, $a$, is sprayed by means of a jet, $g$, into a drying chamber, $c$, with a tubular extension, $k$, in which it mingles with a heated current of water vapor and carbon dioxid preferably in the proportion of one part of water vapor to 5 or 6 parts of carbon dioxid entering from a heater $f$. The temperature in the drying chamber is maintained at 60–65° C. The water in the spray is evaporated by the gaseous current in the drying chamber, whence the powder is removed continuously by a conveyer or the like, $h$, into a suitable receptacle, $i$. The cover, $j$, may open with a certain load of product, without letting air or the gaseous mixture pass through in either direction. The gaseous mixture on leaving the drying chamber passes through a condenser, $d$, in which it is cooled sufficiently to eliminate the moisture taken up from the spray, and is then delivered by a blower, $e$, into the heater, $f$, in order to be raised to the desired temperature before again entering the drying chamber. Any necessary adjustment of the quantities of carbon dioxid or water vapor may be made by the introduction of the desired quantity of the substance at any suitable point in the gaseous circuit as by the pipe $l$ in connection through the valve $q$, with a steam supply and through the valve $u$, with a supply of carbon dioxid as indicated by the vessel of liquid or compressed gas at $m$.

The proportion of carbon dioxid to water vapor in the current entering the drying chamber is governed by the temperature to which the mixture is cooled in the condenser, but for economic working it should preferably not exceed six volumes of carbon dioxid to one volume of water vapor, a mixture of this composition corresponding to carbon dioxid saturated with moisture at a temperature of about 55° C.

It will be seen that according to the present invention the milk or the like is desiccated by spraying it into a current of carbon dioxid or of water vapor and carbon dioxid, which has been heated to a temperature depending upon the drying effect which it is desired to produce and the nature of the milk preparation to be treated. Dry or ordinary moist carbon dioxid may be used, but for economic reasons I prefer to use a mixture of water vapor and carbon dioxid which has been heated to a temperature above the condensing point of the water vapor in the mixture, and the gaseous current is preferably caused to circulate through the apparatus in such a manner that it is successively heated to the desired initial temperature mingled with the spray of liquid to be treated, separated from the desiccated product, cooled sufficiently to condense and eliminate only a quantity of water corresponding to that taken up from the spray, and then again heated to the initial temperature. The higher the temperature can be kept in the drying chamber, the better the drying effect, but the temperature has to be regulated according to the nature of the milk or milk preparation treated. In desiccating skim milk, for example, the temperature in the drying chamber may be kept at about 90° C. and the gaseous current may afterward be cooled by passage through the condenser $d$ when such is employed, the tubes $p$ being surrounded by cooling medium, which enters at $q$ and leaves at $r$, to about 85° C. to eliminate the moisture taken up from the spray. The mixed gases circulated in this case may preferably consist of one volume of water vapor to each volume of carbon dioxid. Whole milk and cream cannot advantageously be desiccated at so high a temperature as skim milk; for treating them the temperature of the drying chamber is preferably to be kept at about 61° C. and the gases afterward cooled to about 55° C. The gases circulated in this case will preferably contain about one volume of water vapor to 5 to 6 volumes of dioxid.

Carbon dioxid and mixtures of water vapor and carbon dioxid possess a high specific heat, and their drying power is therefore considerably greater than that of air, nitrogen, hydrogen, and other gases of comparatively low specific heat.

The product obtained according to the present process is a dust fine soluble powder composed of minute spherules (due to its formation from a spray) and containing absorbed carbon dioxid.

Carbon dioxid appears to have a specific action on the dried milk substance, which absorbs from 0.3 to 1 volume (under certain circumstances more) of dioxid per unit volume of dried product. The good keeping qualities of milk substance dried by means of carbon dioxid or a mixture of water vapor and carbon dioxid and the agreeable fresh taste of the product when mixed with water, are apparently attributable to this absorption.

I find that by the use of substantially saturated carbon dioxid I obtain a very economic process and very little real cooling is necessary for the separation of the water taken up from the milk and therefore only a minimum of heat is wasted.

By manipulation of the conditions such as the gaseous desiccating agent I can obviously control the efficiency of the cycle of operations and the cooling required as desired.

The separation of the dried product from the gaseous current in the drying chamber has been found to occur more readily than when air is used, and the loss due to substance being carried off by the gas is insignificant. Indeed I find that sieves are not necessary for the separation of the powder from the gases.

Having now described my invention what I claim as new and desire to secure by Letters Patent is:—

1. The process of desiccating lacteal substances, consisting in evaporating the moisture therefrom by a heated gaseous medium composed of carbon dioxid and water vapor, as set forth.

2. The process of desiccating lacteal substances, which consists in evaporating the moisture therefrom, by a heated gaseous medium composed of six parts by volume of carbon dioxid, and one part by volume of water vapor, as set forth.

3. The process of desiccating fluid lacteal substances, which consists in evaporating the moisture therefrom, by finely dividing the fluid substance, exposing the finely divided fluid in a heated gaseous non-oxidizing medium, containing carbon dioxid, and collecting the desiccated product, as set forth.

4. The process of desiccating lacteal substances, consisting in evaporating the moisture therefrom, by spraying the lacteal substance into a heated, non-oxidizing gaseous medium, containing carbon dioxid, and collecting the desiccated product, as set forth.

5. A process of desiccating lacteal substances, which consists in evaporating the moisture therefrom by spraying the liquid substance into a heated current of carbon dioxid and steam, and collecting the desiccated product, as set forth.

6. The process of desiccating lacteal substances, which consists in evaporating the moisture therefrom by passing the substance in a finely divided form into a heated current of carbon dioxid and steam, and collecting the desiccated product, as set forth.

7. The process of desiccating lacteal substances, which consists in evaporating the moisture therefrom, by spraying the liquid substance into a heated circulating current of steam and carbon dioxid, separating the desiccated product from the gaseous mixture, cooling the gaseous mixture sufficiently to eliminate a quantity of water substantially corresponding to that absorbed from the spray, and re-heating the gaseous mixture for further use, as set forth.

8. The process for desiccating lacteal substances which consists in evaporating the moisture therefrom by spraying the fluid substance into a heated current of carbon dioxid, containing a relatively high percentage of water vapor, which absorbs water from the spray, separating the desiccated product from the gaseous current, cooling the latter sufficiently to deposit an amount of water substantially equivalent to that absorbed from the lacteal substance, re-heating the partially dried gas to its initial temperature, and returning the same to the drying chamber, as set forth.

9. A desiccated lacteal product in the form of minute spherules containing carbon dioxid in loose combination, as set forth.

In testimony whereof I have signed my name to this specification in the presence of two subscribing witnesses.

MARTIN EKENBERG.

Witnesses:
FRANCIS J. BIGNELL,
P. A. OUTHWAITE.